United States Patent
Kuroda

(10) Patent No.: US 11,645,061 B2
(45) Date of Patent: May 9, 2023

(54) CONSTRUCTION AUTOMATION TOOL FOR AUTOMATIC CREATION OF A PROCEDURE GENERATION PROGRAM FOR CHANGING COMPLEX SYSTEMS

(71) Applicant: NEC Corporation, Tokyo (JP)

(72) Inventor: Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 16/068,150

(22) PCT Filed: Jan. 17, 2017

(86) PCT No.: PCT/JP2017/001297
§ 371 (c)(1),
(2) Date: Jul. 5, 2018

(87) PCT Pub. No.: WO2017/126480
PCT Pub. Date: Jul. 27, 2017

(65) Prior Publication Data
US 2019/0026093 A1    Jan. 24, 2019

(30) Foreign Application Priority Data

Jan. 18, 2016 (JP) .............................. JP2016-006904

(51) Int. Cl.
*G06F 8/61* (2018.01)
*G06F 9/48* (2006.01)
(Continued)

(52) U.S. Cl.
CPC ............ *G06F 8/63* (2013.01); *G06F 9/44505* (2013.01); *G06F 9/45558* (2013.01); *G06F 9/48* (2013.01); *G06F 9/4881* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

2013/0290695 A1* 10/2013 Ogawa .................... G06F 21/57
713/100
2014/0280528 A1* 9/2014 Brandes ............... G05B 19/056
709/204
(Continued)

FOREIGN PATENT DOCUMENTS

JP    2015-215885 A    12/2015
JP    2015-215886 A    12/2015
(Continued)

OTHER PUBLICATIONS

Kuroda et al., "Model-based IT Change Management for Large System Definitions with State-related Dependencies", 2014 IEEE 18th International Enterprise Distributed Object Computing Conference, 2014, pp. 170-179 (total 10 pages).
(Continued)

*Primary Examiner* — Lewis A Bullock, Jr.
*Assistant Examiner* — Melissa A Headly
(74) *Attorney, Agent, or Firm* — Sughrue Mion, PLLC

(57) ABSTRACT

A procedure generation system receives an input of a configuration definition, and generates an operation procedure for the configuration definition, the configuration definition including definitions of a plurality of state elements. The plurality of state elements includes a state element having a limiting condition that a value of a property within a definition of a state element may be referenced when the state element is in a predetermined state. The procedure generation system includes an appender that adds a stipulation that a state element having the limiting condition be in the predetermined state, to a condition of a state transition (Continued)

of a predetermined state element in which a property within a definition of a state element having the limiting condition is referenced.

13 Claims, 26 Drawing Sheets

(51) Int. Cl.
*G06F 9/50* (2006.01)
*G06F 9/445* (2018.01)
*G06F 9/455* (2018.01)

(56) References Cited

U.S. PATENT DOCUMENTS

| | | | |
|---|---|---|---|
| 2015/0018977 A1* | 1/2015 | Law | G05B 19/0426 700/12 |
| 2016/0197936 A1* | 7/2016 | Drangula | H04L 41/0816 726/1 |
| 2016/0308912 A1* | 10/2016 | Mulgaonkar | G06F 21/577 |
| 2016/0350097 A1* | 12/2016 | Mahapatra | G06F 8/654 |

FOREIGN PATENT DOCUMENTS

| | | |
|---|---|---|
| WO | 2011/046559 A1 | 4/2011 |
| WO | 2015/194139 A1 | 12/2015 |

OTHER PUBLICATIONS

Katsuno et al., "Install Izon Kankei ga aru Composite Application Server no Kosoku Development (Rapid Deployment of Composite Application Servers having installation dependencies)", Technical Report of the Institute of Electronics, Information and Communication Engineers, May 21, 2015, vol. 115, No. 61, pp. 101-108 (total 8 pages).

International Search Report dated Apr. 18, 2017, issued by the International Searching Authority in application No. PCT/JP2017/001297.

* cited by examiner

Fig. 3

```
{
    "DOCUMENT CLASSIFICATION" : "STATUS ELEMENT DEFINITION" ,
    "TYPE NAME" : "IP" ,
    "PROPERTY" : [],
    "STATE PROPERTY" : {
      "ip" : ""
    },
    "STATE" : {
      "f" : {
        "STATE TRANSITION" : {
          "t" : {
            "OUTPUT" : {
              "ipAddress" : "ip"
            }
          }
        }
      }
      "t" : {
        "STATE TRANSITION" : {"f" : []}
      }
    }
}
```

Fig. 5

```
{
    "DOCUMENT CLASSIFICATION" : "CONFIGURATION DEFINITION" ,
    "STATE ELEMENT" : [
      "ip1" : [
        "TYPE" : "IP" ,
          "CURRENT STATE" : "f" ,
      } ,
      "vm1" : [
        "TYPE" : "VM" ,
        "CURRENT STATE" : "f" ,
        "REQUIRED STATE" : "t" ,
        "PROPERTY" : [
          "ip" : "${ip1.ip}"
        }
      }
    }
}
```

Fig. 9

```
{
    "DOCUMENT CLASSIFICATION" : "STATUS ELEMENT DEFINITION",
    "TYPE NAME" : "VM",
    "PROPERTY" : {
       "ip" : "${generatedIp}"
    },
    "STATE PROPERTY" : {
      "generatedIp" : ""
    },
    "STATE" : {
     "f" : {
       "STATE TRANSITION" : {
         "t" : {
           "OUTPUT" : {
             "ipAddress" : "generatedIp"
           }
         }
       }
     }
     "t" : {
      "STATE TRANSITION" : {"f" : {}}
    }
   }
  }
}
```

Fig. 17

```
{
    "DOCUMENT CLASSIFICATION" : "STATUS ELEMENT DEFINITION",
    "TYPE NAME" : "E1"
    "PROPERTY" : {
        "key1" : "INITIAL VALUE 1"
  },
    "STATE" : {
      "s1" : {
        "STATE TRANSITION" : {
          "s2" : {
            "PROPERTY REFERENCE" : ["key1"]
          }
        }
      },
      "s2" : {
        "STATE TRANSITION" : {"s1":{}}
      }
    }
}
```

Fig. 19

```
[
   "DOCUMENT CLASSIFICATION" : "CONFIGURATION DEFINITION" ,
   "STATE ELEMENT" : [
    "e1" : [
      "TYPE" : "E1" ,
    ],
   "e2" : [
    "TYPE" : "E2" ,
    "LIMITING CONDITION" : [
      "s1->s2" : [ "e1.s2" ],
      "s2->s1" : [ "e1.s2" ]
     ]
    ]
  ]
]
```

Fig. 21

```
{
   "DOCUMENT CLASSIFICATION" : "CONFIGURATION DEFINITION" ,
   "STATE ELEMENT" : [
    "e1" : {
      "TYPE" : "E1" ,
      "CURRENT STATE" : "s1"
    },
    "e2" : {
      "TYPE" : "E2" ,
      "CURRENT STATE" : "s1" ,
      "REQUIRED STATE" : "s2" ,
      "LIMITING CONDITION" : {
        "s1->s2" : [ "e1.s2" ],
        "s2->s1" : [ "e1.s2" ]
      }
    }
  ]
}
```

Fig. 24

```
{
  "DOCUMENT CLASSIFICATION" : "CONFIGURATION DEFINITION",
  "STATE ELEMENT" : {
    "vm1" : {
      "TYPE" : "VM",
      "CURRENT STATE" : "f",
      "PROPERTY" : {
        "ip" : "10.0.0.1"
      }
    },
    "mw1" : {
      "TYPE" : "MW",
      "CURRENT STATE" : "f",
      "REQUIRED STATE" : "t",
      "LIMITING CONDITION" : {
        "f->t" : [ "vm1.t" ],
        "t->f" : [ "vm1.t" ]
      }
    }
  }
}
```

CONSTRUCTION AUTOMATION TOOL FOR AUTOMATIC CREATION OF A PROCEDURE GENERATION PROGRAM FOR CHANGING COMPLEX SYSTEMS

This application is a National Stage Entry of PCT/JP2017/001297 filed on Jan. 17, 2017, which claims priority from Japanese Patent Application 2016-006904 filed on Jan. 18, 2016, the contents of all of which are incorporated herein by reference, in their entirety.

TECHNICAL FIELD

An embodiment of the present invention relates to a procedure generation system and the like.

BACKGROUND ART

A construction automation tool is utilized to facilitate construction work and change work of a large-scale and complex system. Products of a construction automation tool include, for example, Puppet (registered trademark), Chef (registered trademark), and Ansible (registered trademark). All basic methods of construction automation by the products of the construction automation tool are the same.

Specifically, a construction automation tool first defines a construction task in a unit of a component that constitutes a system. Then, the construction automation tool automatically executes construction work of the whole system by executing the defined construction tasks in a correct order.

There are various methods of specifying an execution order of tasks for a product of a construction automation tool. However, in any method of specifying an execution order of tasks, a user is requested to explicitly specify an execution order of tasks.

There is a possibility that an execution order of tasks may depend on a current status of a system targeted for work or a status of a system required to be attained after work. Thus, deep understanding and specialized knowledge about a system targeted for work are required for a user in order to correctly specify an execution order of tasks. In other words, in specifying work of an execution order of tasks, high difficulty and a great amount of work in designing an execution order of tasks, and high work cost resulting from the high difficulty and the great amount of work become a problem.

PTL1, PTL2, and NPL 1 each describe a procedure generation system which solves the above-described problem in specifying work of an execution order of tasks. Each of the procedure generation systems described in PTL1, PTL2, and NPL 1 prescribes a requirement for procedure generation as a universal limiting condition, and derives a correct task execution order dependent on a current state or a required state of a system targeted for construction on the basis of the prescribed limiting condition. An overview of the procedure generation system is described below.

In the procedure generation system, a definition of a component (hereinafter, referred to as a configuration definition) of a system targeted for work is represented as a plurality of state elements. Each state element includes an ID of the state element, a plurality of possible states, a state transition between states, and a property.

The state transition is equivalent to a task of changing a state of the state element. Further, the property is an item which is defined in the state element and settable in the state element. In the state transition, the property of the state element is referenced as a parameter value necessary for execution of the state transition in some cases.

FIG. 16 is an explanatory diagram illustrating one example of a definition of a state element type. In the example illustrated in FIG. 16, a state element type an ID of which is E1 is defined. The definition illustrated in FIG. 16 may represent various state elements in the state element type E1.

In a drawing of a definition of a state element type, characters in an upper left rectangle represent an ID of the state element type. Moreover, as illustrated in FIG. 16, the state element type E1 includes a state s1 and a state s2 as possible states. In a drawing of a definition of a state element type, an ellipse represents a state, and characters in the ellipse represent a state name.

As illustrated in FIG. 16, two state transitions corresponding to a possibility of bidirectional transition of the state element type E1 are defined between the state s1 and the state s2. In a drawing of a definition of a state element type, an arrow linking the ellipses represents a state transition.

As illustrated in FIG. 16, the state element type E1 has key1 as a property. In the example illustrated in FIG. 16, an initial value 1 is defined as an initial value of key1. In a drawing of a definition of a state element type, characters in an upper right rectangle represent a property and a property value.

As illustrated in FIG. 16, a task equivalent to a state transition from the state s1 to the state s2 refers to key1 as an execution parameter. In a drawing of a definition of a state element type, a double-line arrow from the arrow representing the state transition represents reference to the execution parameter from the task equivalent to the state transition, and a white circle represents a state transition of a reference source.

Note that the definition of the state element type as illustrated in FIG. 16 is also described in a text format, for example, as illustrated in FIG. 17. FIG. 17 is an explanatory diagram illustrating one example of a definition of a state element type described in a JSON format. The state element type illustrated in FIG. 17 is similar to the state element type illustrated in FIG. 16.

As described above, a configuration definition is represented as a plurality of state elements. Each state element is defined as an instance (entity) of the state element as will be described later, by use of the definition of the state element type as illustrated in FIG. 16 or FIG. 17. Moreover, a limiting condition is defined between state elements when necessary. The limiting condition indicates a state of another state element which is required to be realized for a particular state transition to be executed.

FIG. 18 is an explanatory diagram illustrating one example of a configuration definition. In the example illustrated in FIG. 18, there are defined two state elements which are e1 being an E1-type state element, and e2 being an E2-type state element. In a drawing of a configuration definition, characters in an upper left rectangle represent an ID of a state element type and an ID of a state element.

Furthermore, as illustrated in FIG. 18, a limiting condition is specified for the state s2 of the state element e1 from each state transition of the state element e2. In a drawing of a configuration definition, a dotted-line arrow represents a limiting condition, and a white circle represents a state transition to which the limiting condition is applied. The limiting condition illustrated in FIG. 18 indicates that a state of the state element e1 is required to be the state s2 for the state transition of the state element e2 to be executed.

Note that the configuration definition as illustrated in FIG. 18 is also described in a text format, for example, as illustrated in FIG. 19. FIG. 19 is an explanatory diagram illustrating one example of a configuration definition described in a JSON format. A configuration definition illustrated in FIG. 19 is similar to a configuration definition illustrated in FIG. 18.

A configuration definition represents an aspect of a predetermined system. Therefore, a change request of the system is defined, for example, by specifying a current state and a required state of each state element in the configuration definition. When being executed on the basis of the definition of the change request, the procedure generation system generates a change procedure of the system for the change request by searching for such an order of state transitions as to cause states of all state elements to make a transition from the current state to the required state while satisfying the limiting condition.

FIG. 20 is an explanatory diagram illustrating one example of a change request definition. In the example illustrated in FIG. 20, the state s1 is specified as a current state in both the state element e1 and the state element e2. Moreover, the state s2 is specified as a required state in the state element e2. In a drawing of a change request definition, a double-line ellipse represents a current state, and a black ellipse represents a required state.

Note that the change request definition as illustrated in FIG. 20 is also described in a text format, for example, as illustrated in FIG. 21. FIG. 21 is an explanatory diagram illustrating one example of a change request definition described in a JSON format. The change request illustrated in FIG. 21 is similar to the change request illustrated in FIG. 20.

In the example illustrated in FIGS. 20 and 21, a current state of the state element e2 is the state s1, and different from the state s2 that is a required state. Therefore, in order to meet the change request, execution of a state transition of the state element e2 from the state s1 to the state s2 is required.

However, as illustrated in FIGS. 20 and 21, a limiting condition for the state s2 of the state element e1 is specified for a state transition of the state element e2 from the state s1 to the state s2. Therefore, the procedure generation system derives a procedure of initially causing a state of the state element e1 to make a transition from the state s1 to the state s2, and then causing a state of the state element e2 to make a transition from the state s1 to the state s2.

One example of a procedure derived by the procedure generation system for the change request definition illustrated in FIGS. 20 and 21 is illustrated in FIG. 22. FIG. 22 is an explanatory diagram illustrating one example of a change procedure generated by the procedure generation system.

Each rectangle illustrated in FIG. 22 corresponds to each task configuring the change procedure generated by the procedure generation system for the change request definition illustrated in FIGS. 20 and 21. Moreover, for example, e1(s1, s2) indicates a state transition of the state element e1 from the state s1 to the state s2.

In other words, the change procedure illustrated in FIG. 22 corresponds to a procedure of initially executing a task of e1(s1, s2), and then executing a task of e2(s1, s2). Note that characters in an upper right rectangle of the task of e1(s1, s2) represent an execution parameter referenced by the task.

Furthermore, a particular value may be specified for a property of a state element. FIG. 23 is an explanatory diagram illustrating one example of a change request definition in which a particular value is specified for a property.

An example of a configuration definition illustrated in FIG. 23 indicates a relation between a virtual machine vm1 and middleware mw1 operating on the virtual machine vm1. As illustrated in FIG. 23, the vm1 is a virtual machine (VM) type state element. The mw1 is a middleware (MW) type state element.

Moreover, in the example illustrated in FIG. 23, a state t indicates an active state, and a state f indicates an inactive state. An operation on the middleware mw1 is not executed unless the virtual machine vm1 is active. Thus, as illustrated in FIG. 23, a limiting condition for the state t of the virtual machine vm1 is specified for a state transition of the middleware mw1.

Furthermore, as illustrated in FIG. 23, a task (state transition) of changing a state of the state element vm1 from the state f to the state t refers to a property ip of the state element vm1. In the example illustrated in FIG. 23, "10.0.0.1" is specified as a value of the property ip.

Note that a change request definition in which a particular value is specified for a property as illustrated in FIG. 23 is also described in a text format, for example, as illustrated in FIG. 24. FIG. 24 is an explanatory diagram illustrating one example of a change request definition described in a JSON format in which a particular value is specified for a property. The change request illustrated in FIG. 24 is similar to the change request illustrated in FIG. 23.

One example of a procedure generated by the procedure generation system for the change request definition in which a particular value is specified for a property illustrated in FIGS. 23 and 24 is illustrated in FIG. 25. FIG. 25 is an explanatory diagram illustrating an alternative example of a change procedure generated by the procedure generation system.

The change procedure illustrated in FIG. 25 corresponds to a procedure of initially executing a task of vm1(f, t) referencing an execution parameter ip, and then executing a task of mw1(f, t). A value of the referenced execution parameter ip is "10.0.0.1".

CITATION LIST

Patent Literature

[PTL 1] Japanese Unexamined Patent Application Publication No. 2015-215885
[PTL 2] Japanese Unexamined Patent Application Publication No. 2015-215886

Non Patent Literature

[NPL 1] T. Kuroda and A. Gokhale, "Model-Based IT Change Management for Large System Definitions with State-Related Dependencies" in Enterprise Distributed Object Computing Conference (EDOC), 2014 IEEE 18th International, September 2014, pp. 170-179.

SUMMARY OF INVENTION

Technical Problem

In the example illustrated in FIGS. 23 and 24, the value of the property ip of the virtual machine vm1 is explicitly specified. However, an IP address of a virtual machine is not necessarily required to be specified in advance. Moreover, there is a case where a set value of an IP address may be obtained during procedure execution. There is also a case where a user wishes to save a trouble of explicitly defining a set value of an IP address by using a procedure of setting any value obtained during procedure execution.

A general construction automation tool with which a user explicitly specifies a procedure solves a user's request that a value referenced by a task be undetermined in an initial state, by defining an operation in which an output of the task is recorded in a variable, and another subsequent task refers to the variable.

FIG. 26 is an explanatory diagram illustrating one example of a change procedure in which an output of a task is utilized. The change procedure illustrated in FIG. 26 corresponds to a procedure of initially executing a task of ip1(f, t), and then executing a task of vm1(f, t). Note that characters in a lower right rectangle of the task of ip1(f, t) represent a property output by ip1(f, t).

In other words, FIG. 26 illustrates that the task of vm1(f, t) refers to, as an execution parameter, a value of the property ip output by executing the task of ip1(f, t). Because the value of the property ip is undetermined before the task of ip1(f, t) is executed, no value of the property ip is described in FIG. 26.

Therefore, a procedure generation system is required which may meet a user's request that a value referenced by a task be undetermined in an initial state, and which may generate a change procedure as illustrated in FIG. 26, as a result of meeting the request. In the generation of a change procedure, a correct execution order is needed to be specified in order for a task to be able to refer to a value output by a related task.

Furthermore, a limiting condition required for derivation of a correct execution order also needs to be generated. It is also required to maintain a structure in which a content of a definition specified by a user is as concise as possible, and a redundant specification is eliminated as much as possible. PTL1, PTL2, and NPL 1 do not describe any measure regarding the above-described problem.

Thus, an object of the embodiment of the present invention is to provide a procedure generation system and the like capable of generating such an operation procedure for a plurality of tasks that an output of a predetermined task is utilized in another subsequent task.

Solution to Problem

A procedure generation system according to the embodiment of the present invention receives an input of a configuration definition and generates an operation procedure for the configuration definition. The configuration definition includes definitions of a plurality of state elements. The plurality of state elements include a state element having a limiting condition that a value of a property within a definition of a state element may be referenced when the state element is in a predetermined state. The procedure generation system includes: an appender that adds a stipulation that a state element having the limiting condition be in the predetermined state, to a condition of a state transition of a predetermined state element in which a property within a definition of a state element having the limiting condition is referenced.

A procedure generation method according to the embodiment of the present invention includes receiving an input of a configuration definition, and generating an operation procedure for the configuration definition. The configuration definition includes definitions of a plurality of state elements. The plurality of state elements include a state element having a limiting condition that a value of a property within a definition of a state element may be referenced when the state element is in a predetermined state. The procedure generation method includes: adding a stipulation that a state element having the limiting condition be in the predetermined state, to a condition of a state transition of a predetermined state element in which a property within a definition of a state element having the limiting condition is referenced.

A storage medium according to the embodiment of the present invention stores a procedure generation program executed in a computer receiving an input of a configuration definition, and generating an operation procedure for the configuration definition. The configuration definition includes definitions of a plurality of state elements The plurality of state elements include a state element having a limiting condition that a value of a property within a definition of a state element may be referenced when the state element is in a predetermined state The procedure generation program causes the computer to execute: adding processing of adding a stipulation that a state element having the limiting condition be in the predetermined state, to a condition of a state transition of a predetermined state element in which a property within a definition of a state element having the limiting condition is referenced.

Advantageous Effects of Invention

According to the embodiment of the present invention, it is possible to generate such an operation procedure for a plurality of tasks that an output of a predetermined task is utilized in another subsequent task.

BRIEF DESCRIPTION OF DRAWINGS

FIG. 3 is an explanatory diagram illustrating one example of a definition of a state element type described in a JSON format and having a state property.

FIG. 5 is an explanatory diagram illustrating one example of a configuration definition described in a JSON format and including a state element that refers to a state property of another state element.

FIG. 9 is an explanatory diagram illustrating one example of a definition of a state element type described in a JSON format and having a property that refers to a state property of the state element type itself.

FIG. 17 is an explanatory diagram illustrating one example of a definition of a state element type described in a JSON format.

FIG. 19 is an explanatory diagram illustrating one example of a configuration definition described in a JSON format.

FIG. 21 is an explanatory diagram illustrating one example of a change request definition described in a JSON format.

FIG. 24 is an explanatory diagram illustrating one example of a change request definition described in a JSON format in which a particular value is specified for a property.

DESCRIPTION OF EMBODIMENTS

Example Embodiment 1

[Description of Configuration]

Figure 1:
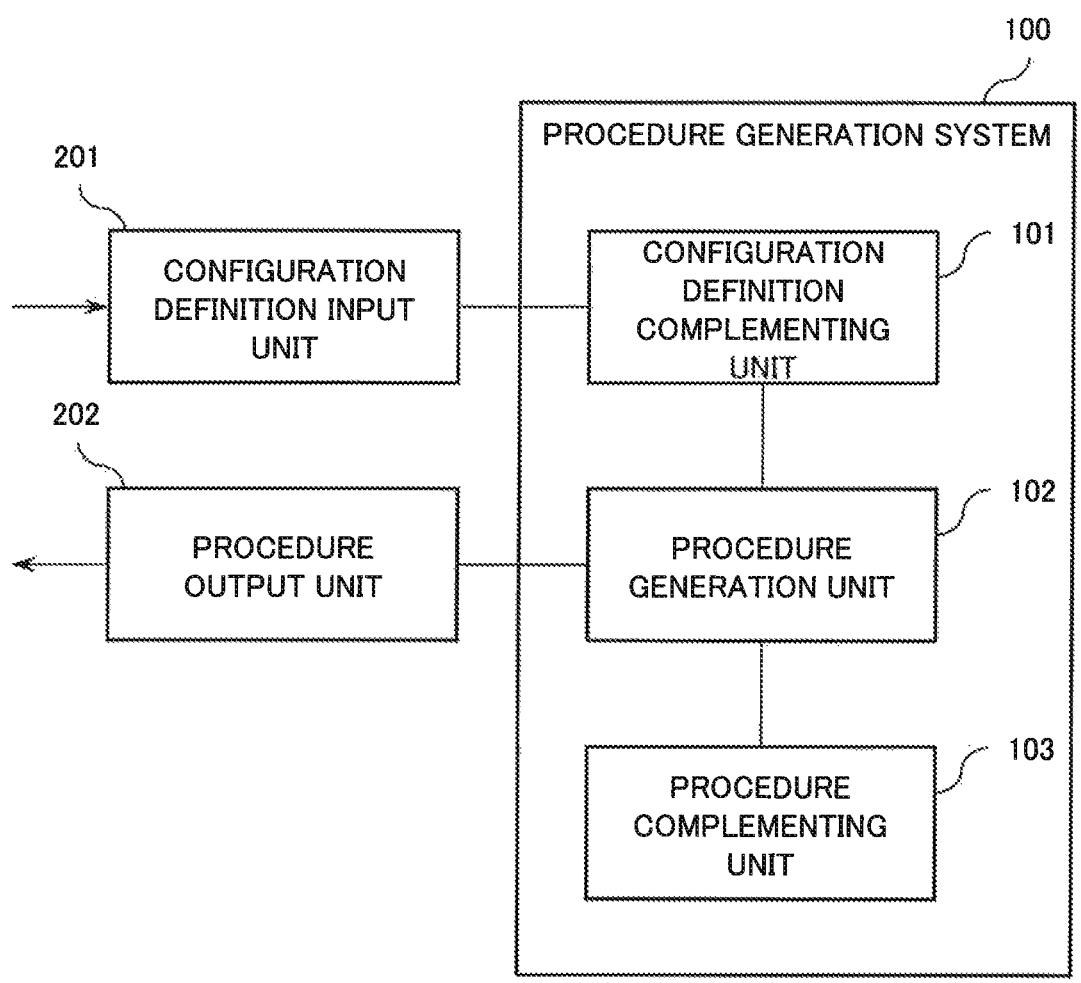
FIG. 1 is a block diagram illustrating a configuration example of a first example embodiment of a procedure generation system 100 according to the embodiment of the present invention.

Hereinafter, example embodiments of the present invention will be described with reference to the drawings. FIG. 1 is a block diagram illustrating a configuration example of a first example embodiment of a procedure generation system 100 according to the embodiment of the present invention. As illustrated in FIG. 1, the procedure generation system 100 according to the present example embodiment includes a configuration definition complementing unit 101, a procedure generation unit 102, and a procedure complementing unit 103.

The configuration definition complementing unit 101 has a function of obtaining a configuration definition specified by a user as an input, and complementing the input configuration definition with a required limiting condition. As illustrated in FIG. 1, the configuration definition complementing unit 101 is coupled to a configuration definition input unit 201 outside the procedure generation system 100 in such a manner as to be able to communicate therewith via a communication network or the like. Note that the procedure generation system 100 may include the configuration definition input unit 201.

The configuration definition specified by the user is input to the configuration definition input unit 201. The configuration definition input unit 201 transmits the input configuration definition to the configuration definition complementing unit 101. The configuration definition complementing unit 101 complements the received configuration definition with a limiting condition. Then, the configuration definition complementing unit 101 transmits the configuration definition complemented with the limiting condition to the procedure generation unit 102.

In addition, before complementing with the limiting condition, the configuration definition complementing unit 101 solves a value of a property of each state element included in the received configuration definition. In other words, the configuration definition complementing unit 101 clarifies an entity of the value of the property of each state element.

For example, the configuration definition complementing unit 101 determines whether the value of the property of each state element is a literal, a state property, or a value of a reference destination. The literal means being a specific value.

When the value of the property of the state element is determined to be a value of a reference destination, the configuration definition complementing unit 101 further clarifies an entity of a value of the reference destination. When the value of the reference destination is a property, the configuration definition complementing unit 101 further checks the value of the property. When the checked value of the property is further a value of a reference destination, the configuration definition complementing unit 101 sequentially searches values of reference destinations.

When the value of the property of the state element or the value that has been searched for is determined to be a literal or a state property, the configuration definition complementing unit 101 sets the determined value as a true value, and ends the search.

The procedure generation unit 102 has a function of obtaining, as an input, the configuration definition complemented with the limiting condition output by the configuration definition complementing unit 101, and generating an operation procedure on the basis of the input configuration definition. The procedure generation unit 102 transmits the generated operation procedure to the procedure complementing unit 103.

Note that as illustrated in FIG. 1, the procedure generation unit 102 is coupled to a procedure output unit 202 outside the procedure generation system 100 in such a manner as to be able to communicate therewith via a communication network or the like. Note that the procedure generation system 100 may include the procedure output unit 202.

The procedure complementing unit 103 has a function of obtaining, as an input, the operation procedure output by the procedure generation unit 102, and complementing the input operation procedure with an operation of exchanging values. The procedure complementing unit 103 transmits, to the procedure generation unit 102, the operation procedure complemented with the operation.

Then, the procedure generation unit 102 obtains, as an input, the operation procedure complemented with the operation output by the procedure complementing unit 103, and transmits the input operation procedure to the procedure output unit 202. The procedure output unit 202 outputs the received operation procedure.

Figure 16:
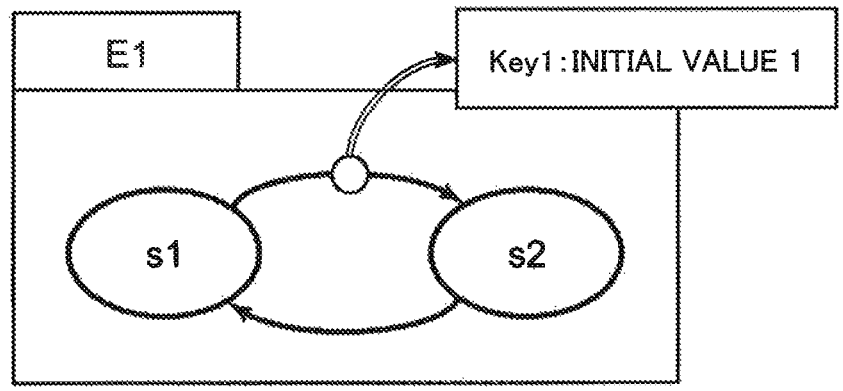
FIG. 16 is an explanatory diagram illustrating one example of a definition of a state element type.
Figure 18:
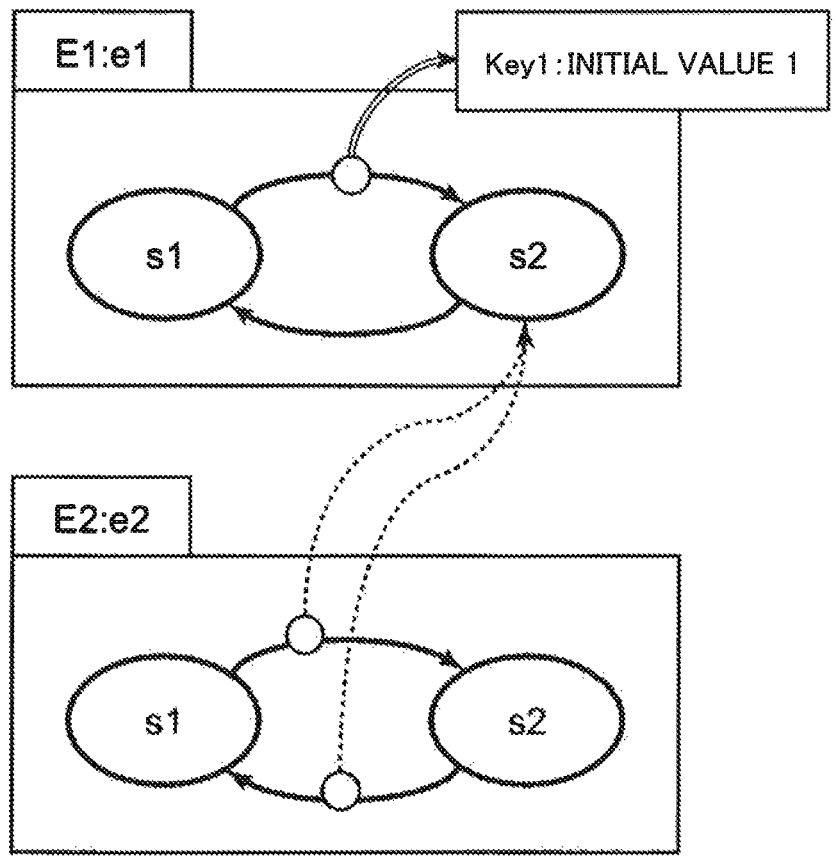
FIG. 18 is an explanatory diagram illustrating one example of a configuration definition.
Figure 20:
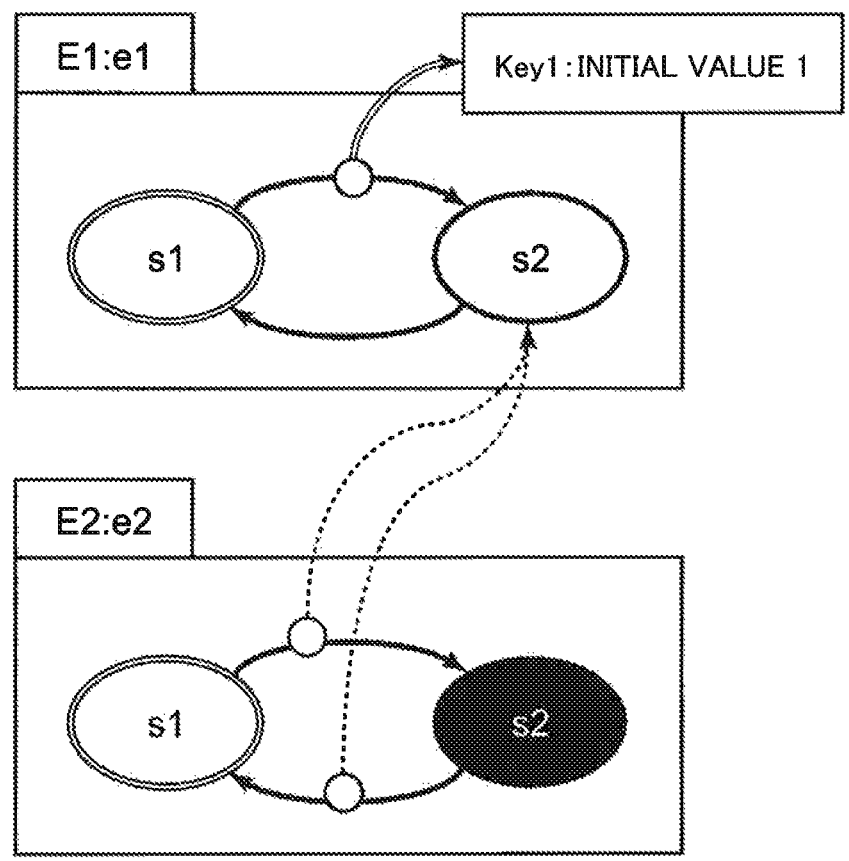
FIG. 20 is an explanatory diagram illustrating one example of a change request definition.
Figure 22:
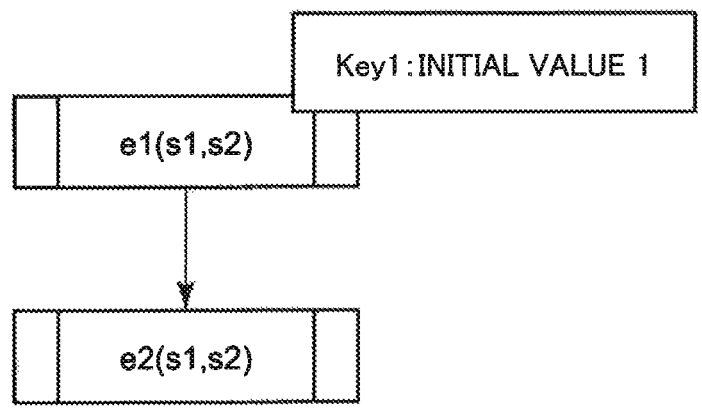
FIG. 22 is an explanatory diagram illustrating one example of a change procedure generated by the procedure generation system.
Figure 23:
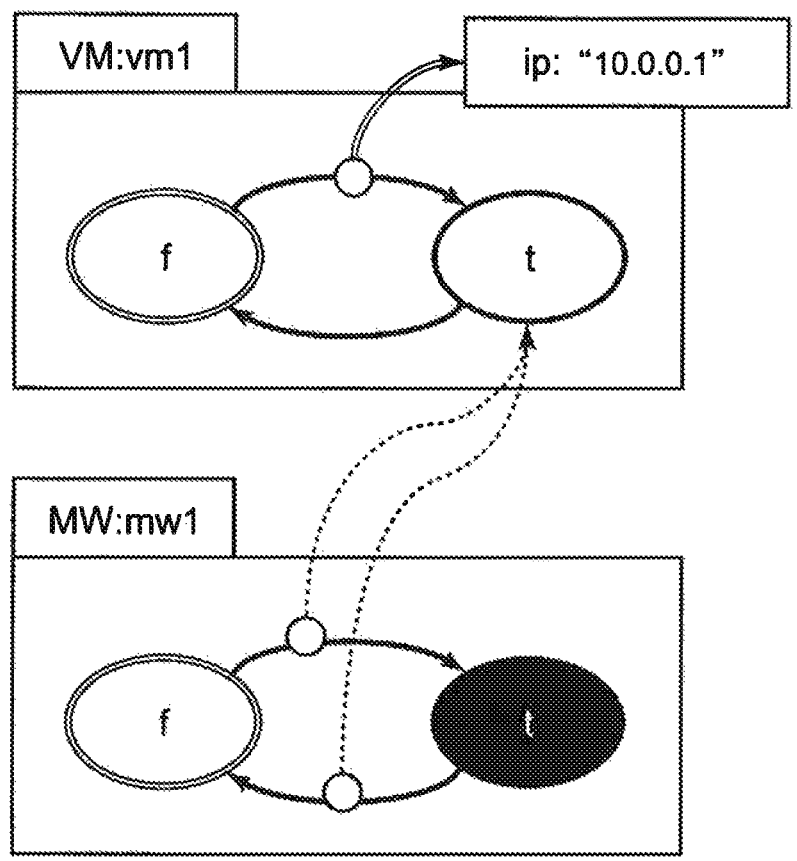
FIG. 23 is an explanatory diagram illustrating one example of a change request definition in which a particular value is specified for a property.
Figure 25:
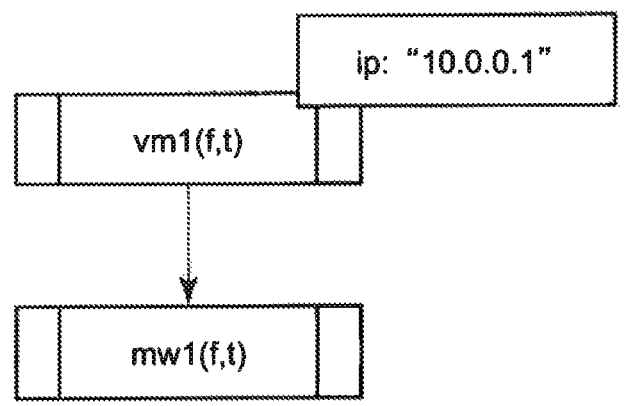
FIG. 25 is an explanatory diagram illustrating an alternative example of a change procedure generated by the procedure generation system.
Figure 26:
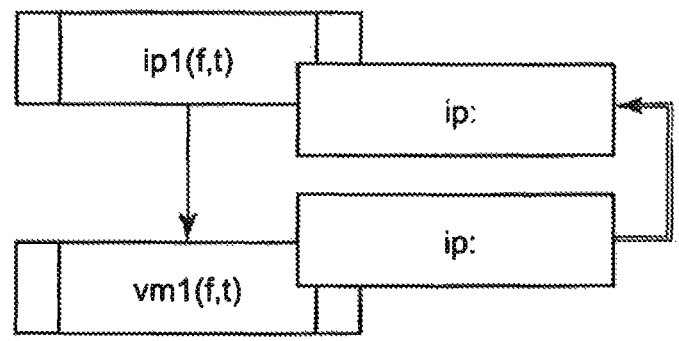
FIG. 26 is an explanatory diagram illustrating one example of a change procedure in which an output of a task is utilized.

A definition of a state element type according to the present example embodiment has a state property, in contrast to a definition of a state element type illustrated in FIGS. 16 and 17. The state property is a property which has a value in a particular state. A state where the state property has a value is defined within a definition of a state element type having a state property.

Figure 2:
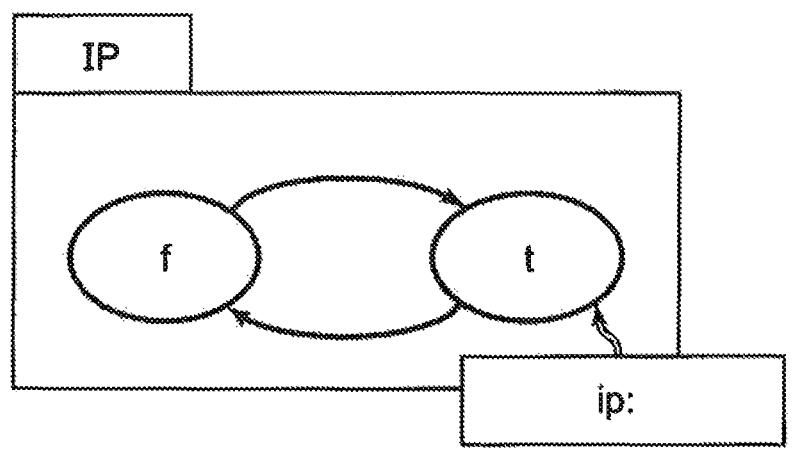
FIG. 2 is an explanatory diagram illustrating one example of a definition of a state element type having a state property.

FIG. 2 is an explanatory diagram illustrating one example of a definition of a state element type having a state property. FIG. 3 is an explanatory diagram illustrating one example of a definition of a state element type described in a JSON format and having a state property. The state element type illustrated in FIG. 3 is similar to the state element type illustrated in FIG. 2.

In the example illustrated in FIGS. 2 and 3, a state element type of IP is defined. As illustrated in FIG. 3, the state element type IP has ip as a state property. A lower right rectangle illustrated in FIG. 2 corresponds to the fact that the state element type IP has ip as a state property.

Furthermore, in FIG. 3, it is specified that in a state transition from a state f to a state t, an output value of a task identified by a character string ipAddress is substituted for ip which is the state property of the state element type IP. Therefore, ip is identified as a state property which has a value in the state t. A double-line arrow from the lower right rectangle to the state t illustrated in FIG. 2 corresponds to the fact that the property ip has a value in the state t.

In a configuration definition according to the present example embodiment, a value of a property of a state element may be defined as a property of another state element of a reference destination, or a state property. An example of a configuration definition including a state element that refers to a state property of another state element is indicated below.

Figure 4:
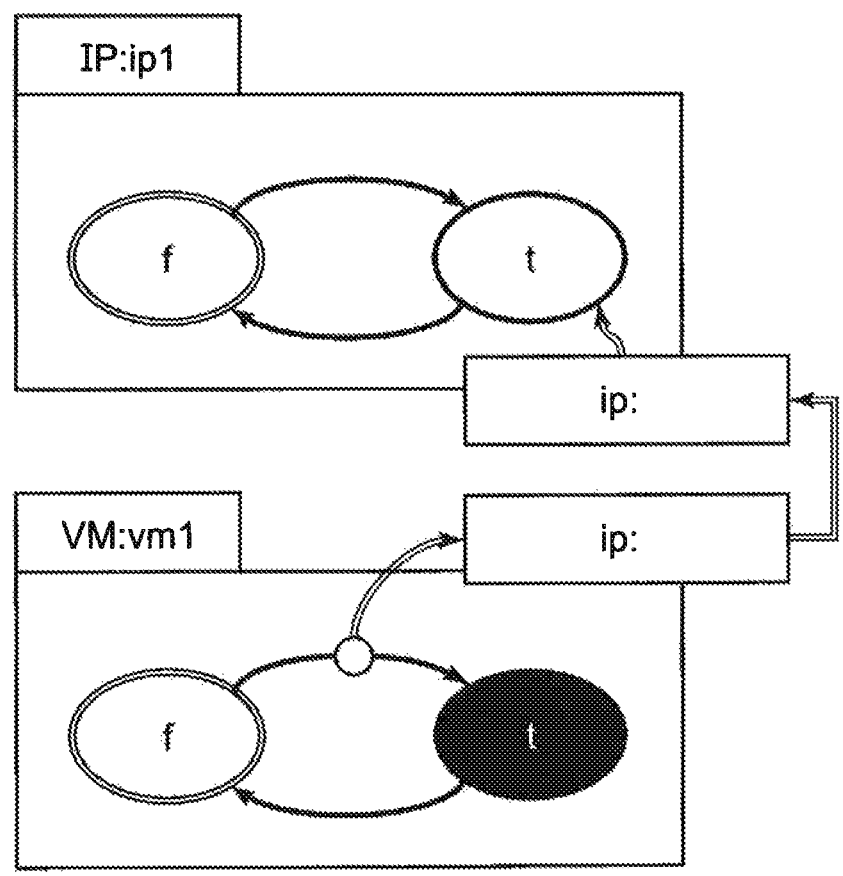
FIG. 4 is an explanatory diagram illustrating one example of a configuration definition including a state element that refers to a state property of another state element.

FIG. 4 is an explanatory diagram illustrating one example of a configuration definition including a state element that refers to a state property of another state element. FIG. 5 is an explanatory diagram illustrating one example of a configuration definition described in a JSON format and including a state element that refers to a state property of another state element. A configuration definition illustrated in FIG. 5 is similar to a configuration definition illustrated in FIG. 4.

In the example illustrated in FIGS. 4 and 5, a state element vm1 refers to a state property ip of a state element ip1 as a value of the property ip. Note that a character string "${ip1.ip}" illustrated in FIG. 5 represents a property of the state element ip1 or ip which is a state property.

As illustrated in FIGS. 4 and 5, the state property ip of the state element ip1 is a state property which has a value when the state element ip1 is in the state t. Therefore, in order for a value to be correctly referenced, it is required that a limiting condition for the state t of the state element ip1 be specified for the state transition of the state element vm1 from the state f to the state t. The state t is a state transition that refers to the state property ip of the state element ip1.

Figure 6:
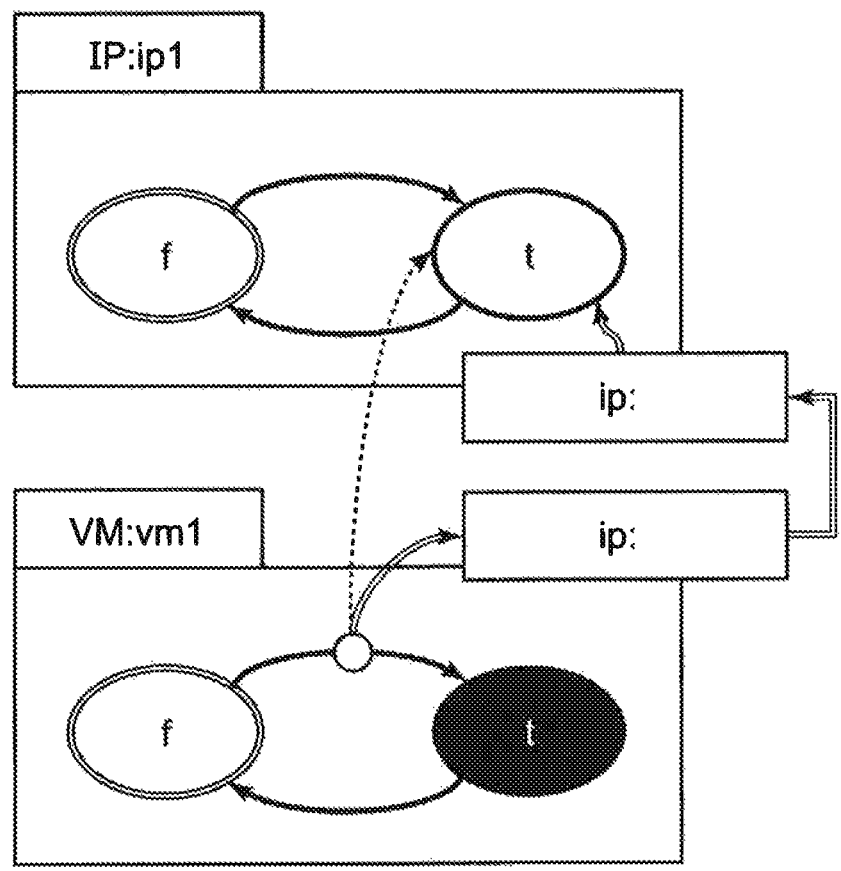
FIG. 6 is an explanatory diagram illustrating one example of a configuration definition including a state element that refers to a state property of another state element complemented with a limiting condition.

FIG. 6 is an explanatory diagram illustrating one example of a configuration definition including a state element that refers to a state property of another state element complemented with a limiting condition. As illustrated in FIG. 6, in contrast to the configuration definition illustrated in FIG. 4, a limiting condition for the state t of the state element ip1 is specified for the state transition of the state element vm1 from the state f to the state t. The limiting condition is specified by the configuration definition complementing unit 101.

Figure 7:
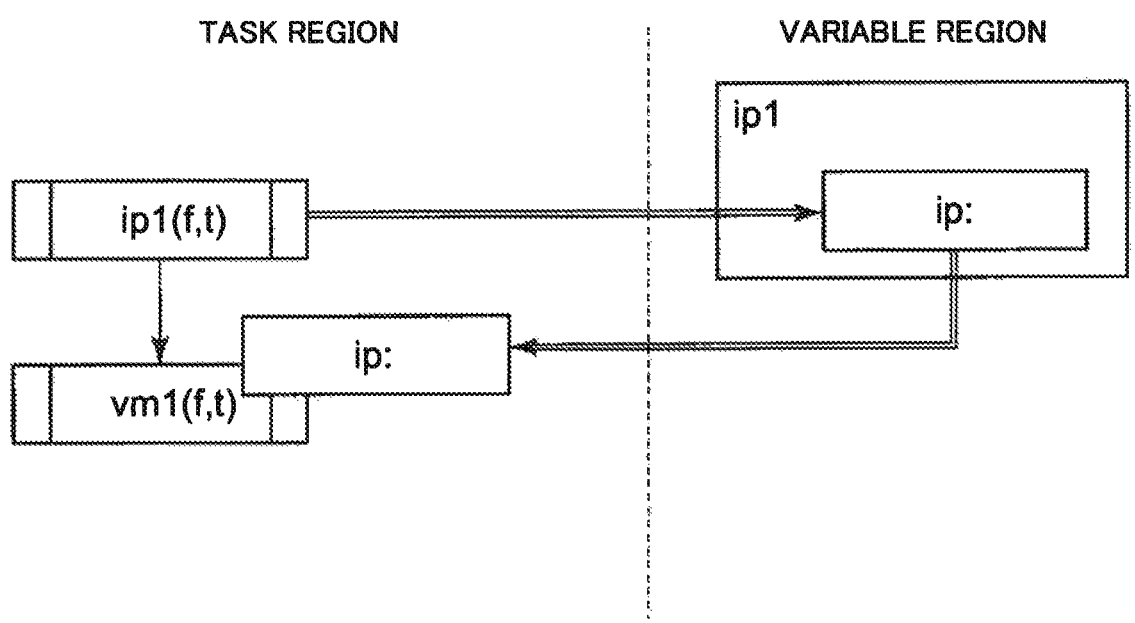
FIG. 7 is an explanatory diagram illustrating one example of a change procedure generated by the procedure generation system 100 according to the present example embodiment.

FIG. 7 is an explanatory diagram illustrating one example of a change procedure generated by the procedure generation system 100 according to the present example embodiment. The change procedure illustrated in FIG. 7 is a change procedure generated by the procedure generation system 100 on the basis of the configuration definition complemented with the limiting condition illustrated in FIG. 6.

As indicated in a task region in FIG. 7, the procedure generation unit 102 generates a change procedure of executing a task of ip1(f, t), and then executing a task of vm1(f, t). Generation processing of the change procedure indicated in the task region by the procedure generation unit 102 is similar to generation processing by a general procedure generation system.

Furthermore, as illustrated in FIG. 7, the procedure generation system 100 according to the present example embodiment adds not only a task region but also a variable region to a generated change procedure. A method which adds a variable region is one example of a method of realizing exchange of values between tasks.

Specifically, the procedure complementing unit 103 complements a generated change procedure with an operation of saving a value output by executing a task in a variable of a corresponding property in a variable region secured for each state element. The procedure complementing unit 103 also complements a generated change procedure with an operation of reading a value from a variable corresponding to a property referenced when a task that refers to a property is executed.

In the example illustrated in FIG. 7, a value of the state property ip output by executing the task of ip1(f, t) is saved in a corresponding variable of the state property ip in a variable region secured for the state element ip1. An arrow extending to the right from the task of ip1(f, t) illustrated in FIG. 7 corresponds to an operation of saving the value of the state property ip output by executing the task of ip1(f, t) in a variable of the state property ip.

Furthermore, in the example illustrated in FIG. 7, a value is read from the variable of the state property ip in the variable region secured for the state element ip1, when the task of vm1(f, t) that refers to the state property ip is executed. An arrow extending to the left from the variable of the state property ip illustrated in FIG. 7 corresponds to an operation of reading a value from the variable of the state property ip when the task of vm1(f, t) that refers to the state property ip is executed.

Note that, for example, even when a property of a reference destination of a task is a normal property that is not a state property, the procedure generation system 100 according to the present example embodiment treats as a task that refers to a state property at a time of generating a procedure as long as a source of a value of the property is a state property.

Therefore, the procedure generation system 100 may suitably generate a change procedure in which an output value during task execution is utilized when a user does not explicitly specify a value. In the generated change procedure, when the user explicitly specifies a value, the specified value is used.

In other words, even when a value is explicitly specified during use of the change procedure generated by the procedure generation system 100, no wasteful waiting for a task resulting from the limiting condition occurs. A specific example of the above change procedure is indicated below.

Figure 8:
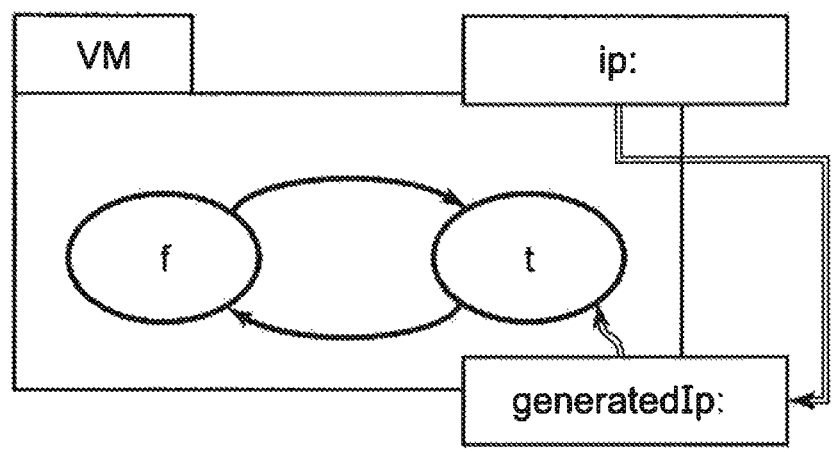
FIG. 8 is an explanatory diagram illustrating one example of a definition of a state element type having a property that refers to a state property of the state element type itself.

FIG. 8 is an explanatory diagram illustrating one example of a definition of a state element type having a property that refers to a state property of the state element type itself. FIG. 9 is an explanatory diagram illustrating one example of a definition of a state element type described in a JSON format and having a property that refers to a state property of the state element type itself. The state element type illustrated in FIG. 9 is similar to the state element type illustrated in FIG. 8.

In the example illustrated in FIGS. 8 and 9, a state element type of VM is defined. In the example illustrated in FIGS. 8 and 9, a property ip of the state element type VM refers to, as an initial value, generatedIp which is a state property of the state element type VM. The state property generatedIp is a state property which has a value when the state element type VM is in the state t.

An arrow from an upper right rectangle to a lower right rectangle illustrated in FIG. 8 corresponds to the operation that the property ip of the state element type VM refers to the state property generatedIp as an initial value. Moreover, a character string "${generatedIp}" illustrated in FIG. 9 represents reference by the property of the state element type to the property of the state element type itself or the state property of the state element type itself.

Figure 10:
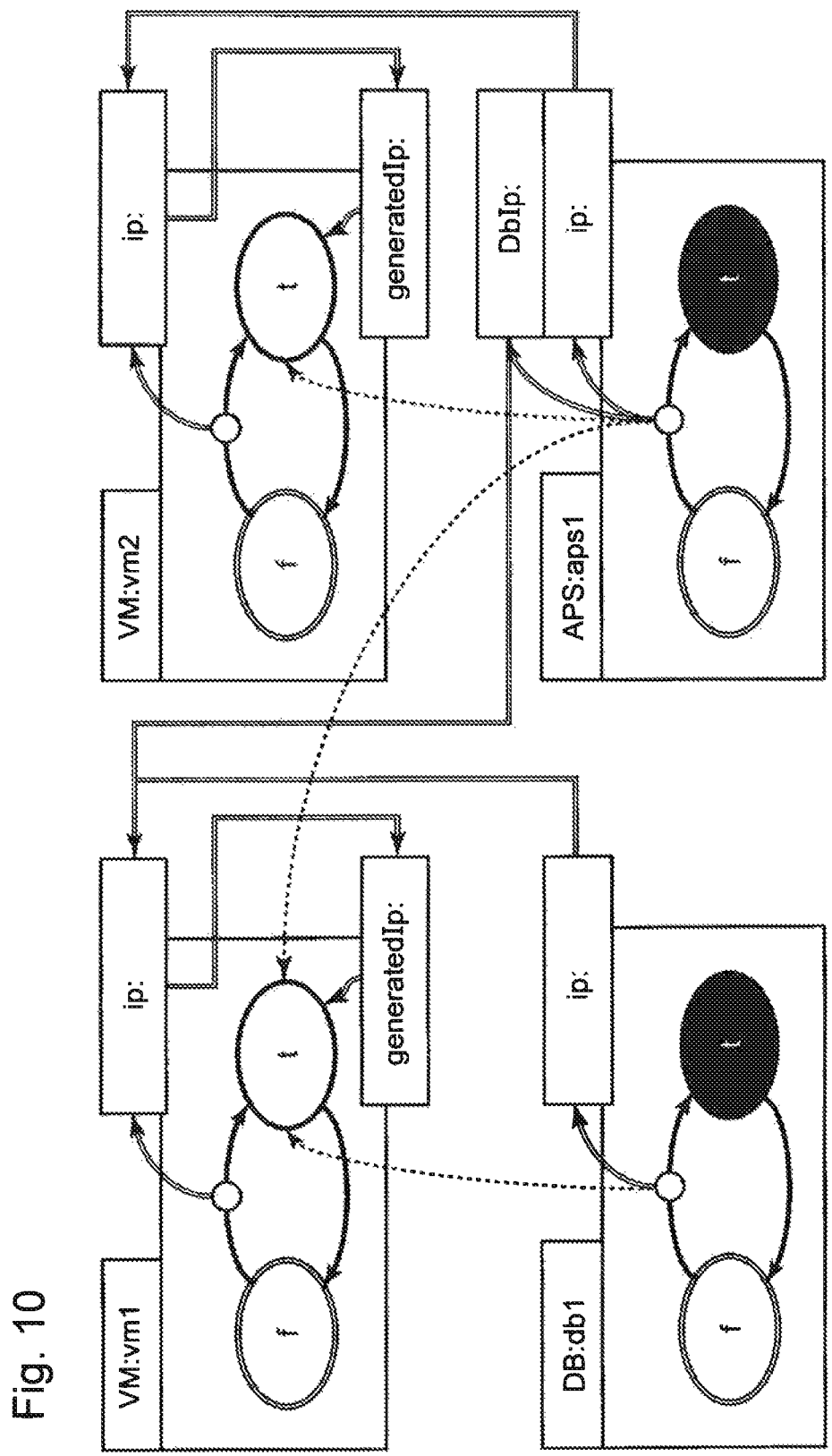
FIG. 10 is an explanatory diagram illustrating one example of a configuration definition including a state element having a property that refers to a state property of the state element itself complemented with a limiting condition.

FIG. 10 is an explanatory diagram illustrating one example of a configuration definition including a state element having a property that refers to a state property of the state element itself complemented with a limiting condition. In the example of the configuration definition illustrated in FIG. 10, a definition of the state element type VM illustrated in FIG. 8 is used.

The configuration definition illustrated in FIG. 10 includes the state element vm1 and a state element vm2 the state element types of which are VMs. Moreover, a state element db1 the state element type of which is a database (DB) is included as middleware that runs in a virtual machine corresponding to the state element vm1. Further, a state element aps1 the state element type of which is an application server (APS) is included as a server that runs in a virtual machine corresponding to the state element vm2.

In the example illustrated in FIG. 10, a state transition of the state element vm1 from the state f to the state t refers to a property ip of the state element vm1. Moreover, a state transition of the state element vm2 from the state f to the state t refers to a property ip of the state element vm2.

Furthermore, in the example illustrated in FIG. 10, a state transition of the state element db1 from the state f to the state t refers to the property ip of the state element db1. Moreover, the property ip of the state element db1 refers to the property ip of the state element vm1. In addition, because the state element db1 runs in a virtual machine corresponding to the state element vm1, a limiting condition for the state t of the state element vm1 is specified for the state transition of the state element db1 from the state f to the state t.

Furthermore, in the example illustrated in FIG. 10, a state transition of the state element aps1 from the state f to the state t refers to a property DbIp and a property ip of the state element aps1. Moreover, the property ip of the state element aps1 refers to the property ip of the state element vm2. In addition, because the state element aps1 runs in a virtual machine corresponding to the state element vm2, a limiting condition for the state t of the state element vm2 is specified for the state transition of the state element aps1 from the state f to the state t.

In addition, the state element aps1 runs in cooperation with the state element db1, and therefore requires, during running, a value of the property ip of the state element vm1 corresponding to a virtual machine in which the state element db1 runs. Thus, as illustrated in FIG. 10, the property DbIp of the state element aps1 refers to the property ip of the state element vm1.

Furthermore, in the example illustrated in FIG. 10, the property ip of the state element vm1 which is a reference destination of the property DbIp refers to the state property generatedIp of the state element vm1. Therefore, as illustrated in FIG. 10, a limiting condition for the state t of the state element vm1 is specified for the state transition, from the state f to the state t, of the state element aps1 which refers to the property DbIp. The specified limiting condition is the limiting condition with which the configuration definition complementing unit 101 of the procedure generation system 100 has complemented.

Figure 11:
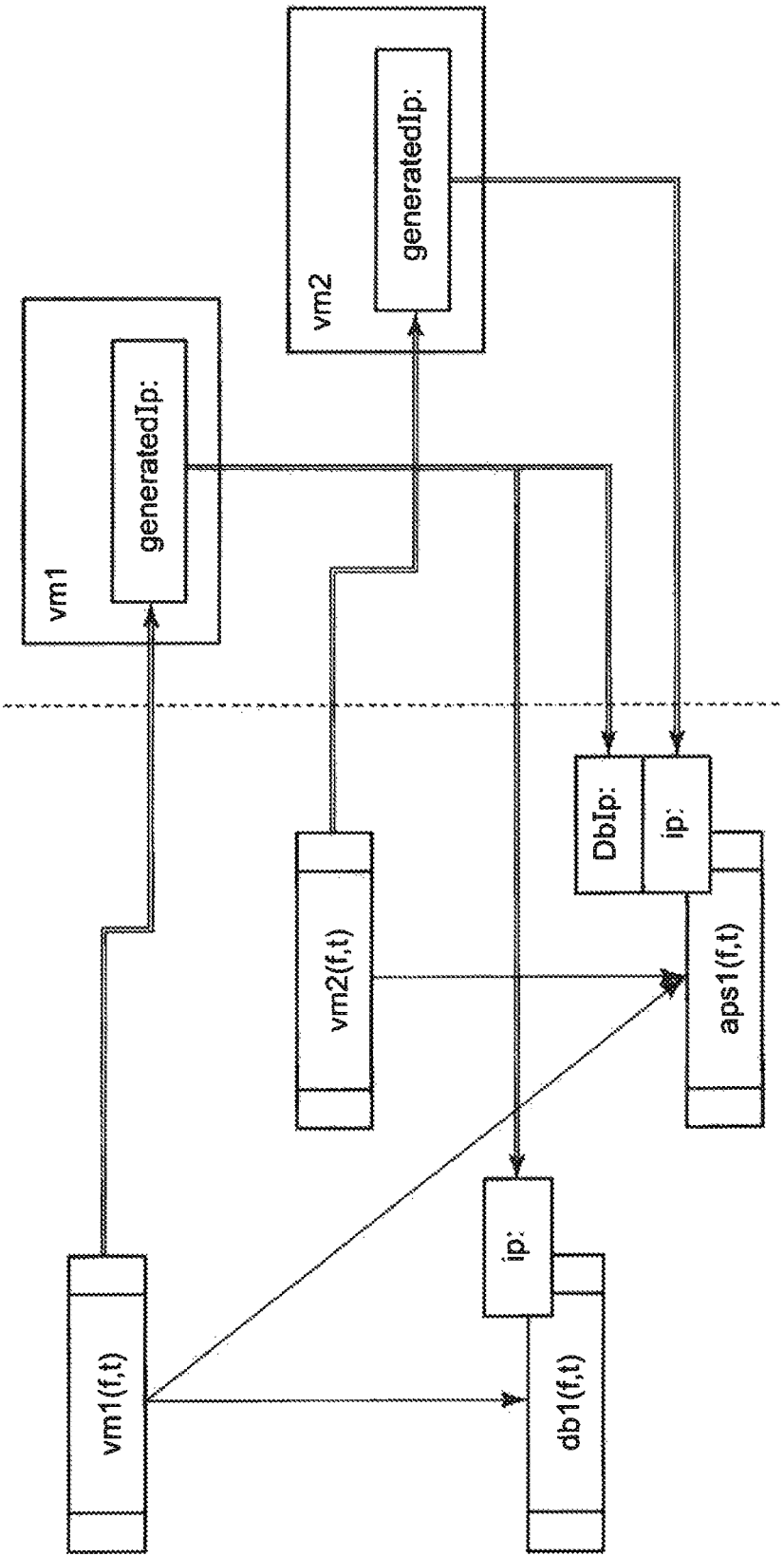
FIG. 11 is an explanatory diagram illustrating an alternative example of a change procedure generated by the procedure generation system 100 according to the present example embodiment.

FIG. 11 is an explanatory diagram illustrating an alternative example of a change procedure generated by the procedure generation system 100 according to the present example embodiment. The change procedure illustrated in FIG. 11 is a change procedure generated by the procedure generation system 100 on the basis of the configuration definition complemented with the limiting condition illustrated in FIG. 10.

As indicated in a task region in FIG. 11, the procedure generation unit 102 generates a change procedure including a procedure of executing a task of vm1(f, t) and then executing a task of db1(f, t), and a procedure of executing a task of vm2(f, t) and then executing a task of aps1(f, t).

Then, in order for a value of the state property generatedIp of the state element vm1 to be correctly exchanged, the procedure generation unit 102 adds, to the generated change procedure, a limitation that a task of vm1(f, t) is executed and then a task of aps1(f, t) is executed. Specifically, the procedure generation unit 102 adds an arrow directed from the task of vm1(f, t) toward the task of aps1(f, t), as illustrated in FIG. 11.

Then, the procedure complementing unit 103 complements with an operation of saving the value of the state property generatedIp output by executing the task of vm1(f, t) in a corresponding variable of the state property generatedIp in a variable region secured for the state element vm1. The procedure complementing unit 103 also complements with an operation of reading a value from the variable of the state property generatedIp in the variable region secured for the state element vm1 during execution of the task of db1(f, t) and the task of aps1(f, t) that refer to the state property generatedIp.

Similarly, the procedure complementing unit 103 complements with an operation of saving the value of the state property generatedIp output by executing the task of vm2(f, t) in a corresponding variable of the state property generatedIp in a variable region secured for the state element vm2. The procedure complementing unit 103 also complements with an operation of reading a value from the variable of the state property generatedIp in the variable region secured for the state element vm2 during execution of the task of aps1(f, t) that refers to the state property generatedIp.

A series of operations above is the processing in which the procedure generation system 100 according to the present example embodiment generates a change procedure on the basis of the configuration definition complemented with the limiting condition illustrated in FIG. 10.

Figure 12:
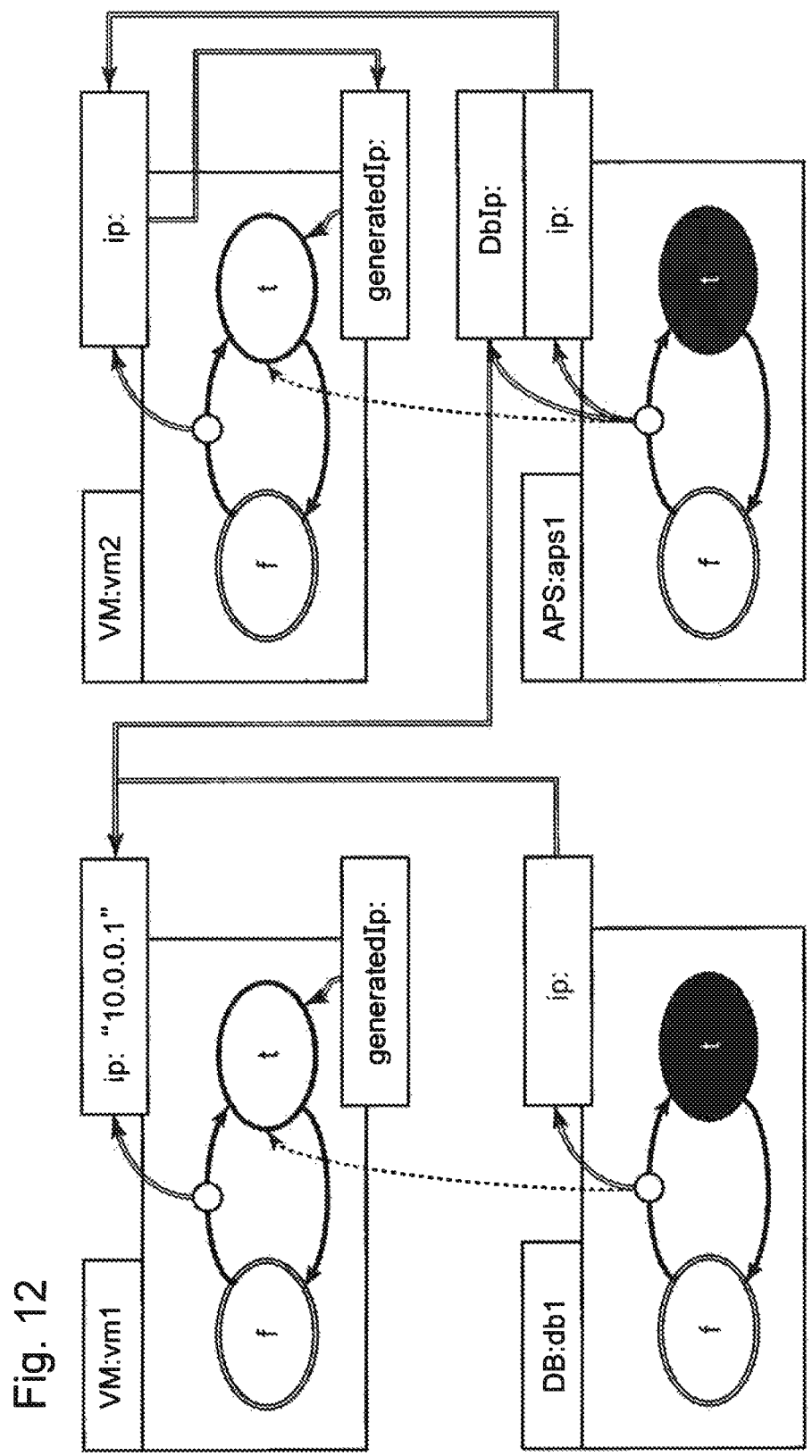
FIG. 12 is an explanatory diagram illustrating one example of a configuration definition in which a limiting condition is eliminated, and which includes a state element having a property that refers to a state property of the state element itself.

FIG. 12 is an explanatory diagram illustrating one example of a configuration definition in which a limiting condition is eliminated, and which includes a state element having a property that refers to a state property of the state element itself.

An example of a configuration definition illustrated in FIG. 12 is an example in the case where a user specifies in such a way that the property ip of the state element vm1 in the example of the configuration definition illustrated in FIG. 10 is overwritten with a value "10.0.0.1". The configuration definition illustrated in FIG. 12 except for the overwritten property ip of the state element vm1 is similar to the configuration definition illustrated in FIG. 10.

As illustrated in FIG. 12, the property DbIp of the state element aps1 still refers to the property ip of the state element vm1 as in the example illustrated in FIG. 10. However, in the present example, because the property ip is overwritten with the value "10.0.0.1", a source of the value of the property ip is not the state property generatedIp, in contract to the example illustrated in FIG. 10.

Therefore, as illustrated in FIG. 12, the property ip of the state element vm1 has the value "10.0.0.1", and no longer refers to the state property generatedIp of the state element vm1. In other words, since the task of aps1(f, t) may be executed even when the state element vm1 is not the state t, the complementary limiting condition illustrated in FIG. 10 has been eliminated together with the specification of the value of the property ip of the state element vm1 as illustrated in FIG. 12.

Figure 13:
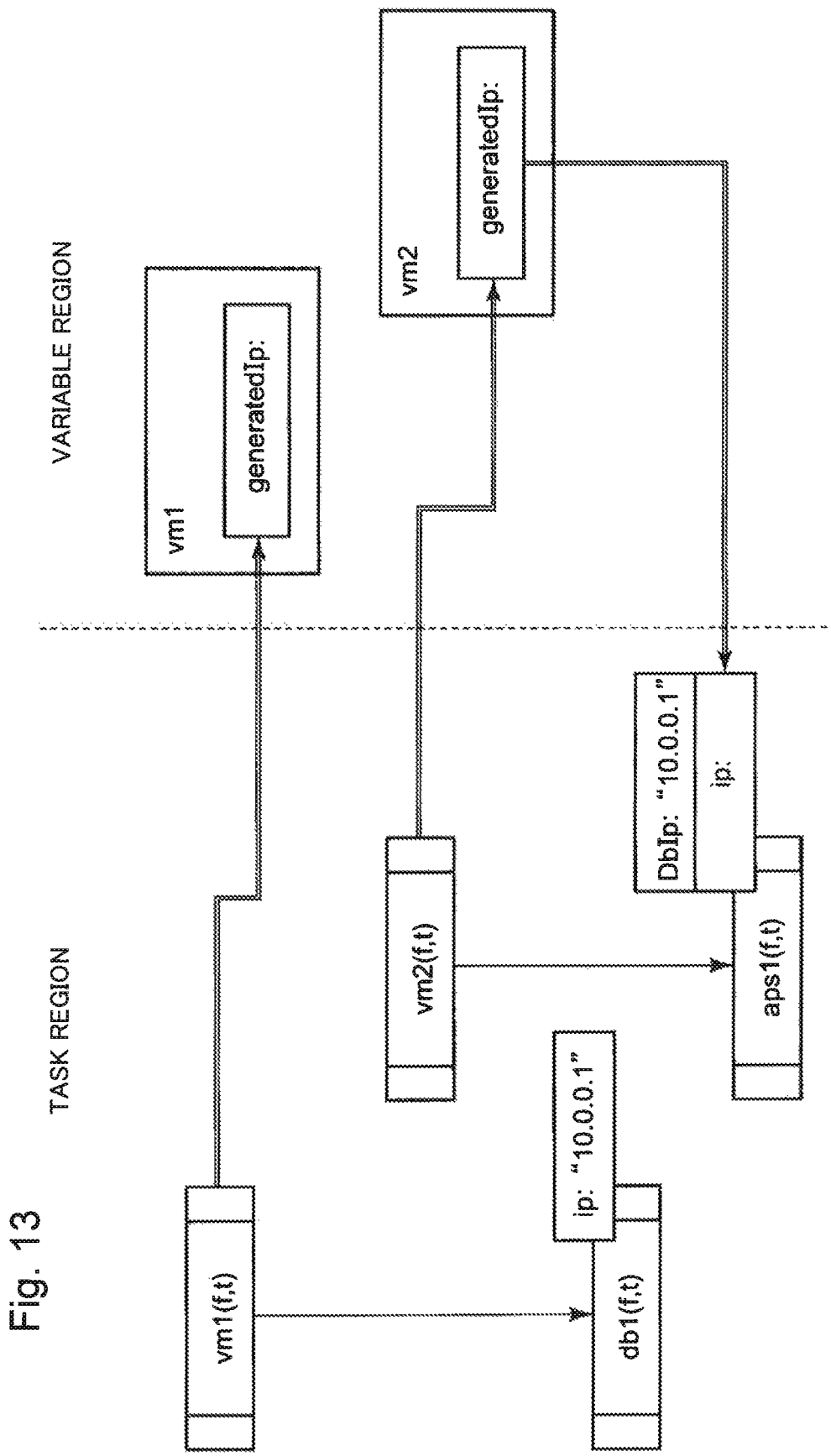
FIG. 13 is an explanatory diagram illustrating an alternative example of a change procedure generated by the procedure generation system 100 according to the present example embodiment.

FIG. 13 is an explanatory diagram illustrating an alternative example of a change procedure generated by the procedure generation system 100 according to the present example embodiment. The change procedure illustrated in FIG. 13 is a change procedure generated by the procedure generation system 100 on the basis of the configuration definition in which the limiting condition illustrated in FIG. 12 is eliminated.

The change procedure illustrated in FIG. 13 does not include the operation described in the change procedure illustrated in FIG. 11 in which a value is read from the variable of the state property generatedIp in the variable region secured for the state element vm1 during execution of the task of db1(f, t) and the task of aps1(f, t).

The reason is that both the value of the property ip referenced by the task of db1(f, t) and the value of the property DbIp referenced by the task of aps1(f, t) are specified to "10.0.0.1". In other words, in the example illustrated in FIG. 13, it is correctly reflected that a value is not exchanged between the task of db1(f, t) and the task of aps1(f, t), and the variable region secured for the state element vm1.

Furthermore, in the change procedure illustrated in FIG. 13, also eliminated is the arrow corresponding to the limitation which has been described in the change procedure illustrated in FIG. 11 and added in such a way that the task of vm1(f, t) is executed and then the task of aps1(f, t) is executed. In the change procedure illustrated in FIG. 13, an order relation is not specified between the task of vm1(f, t) and the task of aps1(f, t).

In other words, when following the change procedure illustrated in FIG. 13, the user may execute, in parallel, the procedure of executing the task of vm1(f, t) and then executing the task of db1(f, t), and the procedure of executing the task of vm2(f, t) and then executing the task of aps1(f, t). The user may more rapidly complete the whole task when executing the procedures in parallel than when following the change procedure illustrated in FIG. 11.

As described above, a user who utilizes the change procedure generated by the procedure generation system 100 according to the present example embodiment may utilize the change procedure without adjusting a definition of a limiting condition every specification even in a case such as the case where a value is specified for a property.

[Description of Operation]

Figure 14:
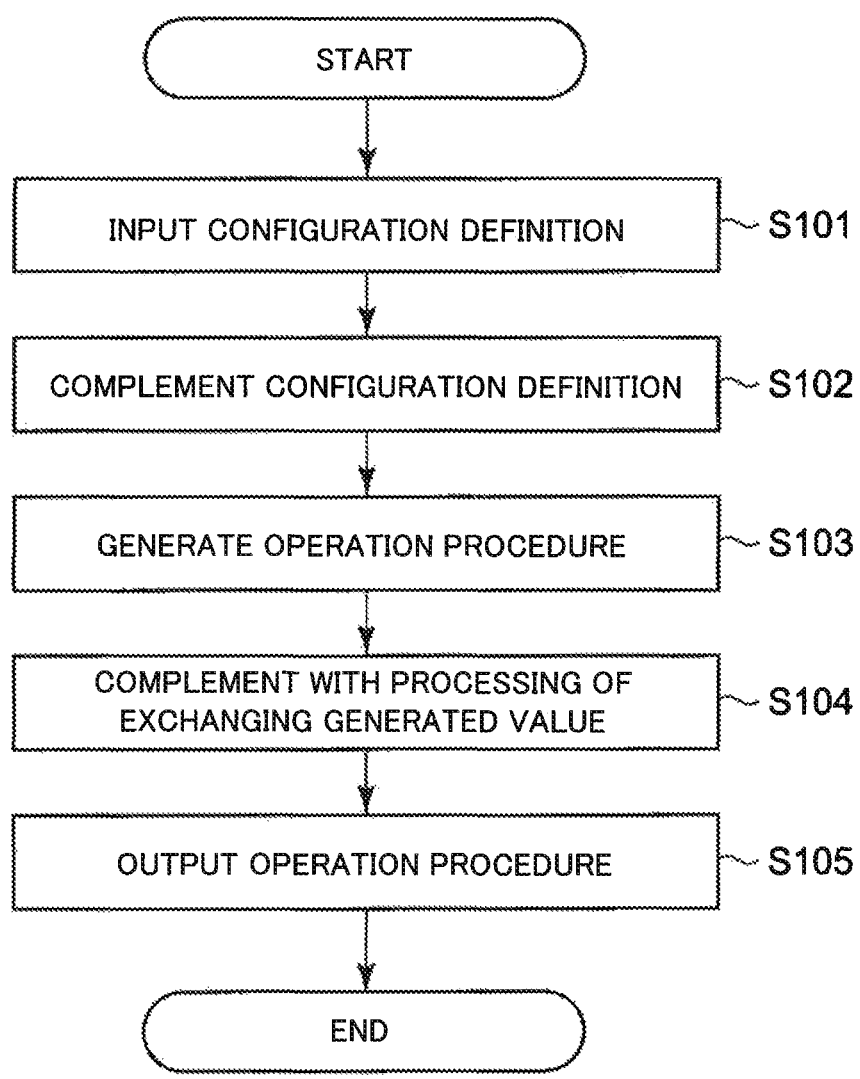
FIG. 14 is a flowchart illustrating an operation of generation processing by the procedure generation system 100 according to the present example embodiment.

An operation of the procedure generation system 100 according to the present example embodiment is described below with reference to FIG. 14. FIG. 14 is a flowchart illustrating an operation of generation processing by the procedure generation system 100 according to the present example embodiment.

A configuration definition is input to the procedure generation system 100 from the outside (step S101). Specifically, the configuration definition complementing unit 101 receives a configuration definition from the configuration definition input unit 201. Then, the configuration definition complementing unit 101 solves a value of a property of each state element included in the received configuration definition.

Then, the configuration definition complementing unit 101 checks all state transitions of each state element. When a source of the value of the property referenced by a state transition is a state property, the configuration definition complementing unit 101 complements the state transition with a limiting condition for a state of a state element in which the state property stores a value (step S102).

Then, the configuration definition complementing unit 101 transmits the configuration definition complemented with the limiting condition to the procedure generation unit 102. The procedure generation unit 102 generates an operation procedure on the basis of the configuration definition transmitted from the configuration definition complementing unit 101 (step S103). After generating the operation procedure, the procedure generation unit 102 transmits the generated operation procedure to the procedure complementing unit 103.

Then, the procedure complementing unit 103 complements the operation procedure transmitted from the procedure generation unit 102 with processing of exchanging a generated value (step S104).

Specifically, when a state transition corresponding to a task is defined to output a value of a state property during execution, the procedure complementing unit 103 complements the generated operation procedure with an operation of extracting a specified value from the output of the task on the basis of the definition, and storing the value in a variable region secured for each state element.

Furthermore, when a state transition corresponding to a task refers to a state property during execution, the procedure complementing unit 103 complements the generated operation procedure with an operation of acquiring a corresponding value from a variable region of a state element having a state property to be referenced.

The procedure complementing unit 103 transmits, to the procedure generation unit 102, the operation procedure complemented with the processing of exchanging a generated value. Then, the procedure generation unit 102 transmits, to the procedure output unit 202, the operation procedure transmitted from the procedure complementing unit 103. In other words, the procedure generation system 100 outputs the generated operation procedure to the outside (step S105). After the output, the procedure generation system 100 ends the generation processing.

[Description of Advantageous Effects]

The procedure generation system according to the present example embodiment may generate such an operation procedure for a plurality of tasks that an output of a predetermined task is utilized in another subsequent task. The reason is that the configuration definition complementing unit complements a configuration definition with a required limiting condition depending on a definition of a reference of a property by a state transition.

Therefore, a user may correctly generate such an operation procedure for a plurality of tasks that an output of a predetermined task is utilized in another subsequent task, by simply specifying a definition of a reference of a property by a state transition in a configuration definition which is a set of state elements. Because the configuration definition complementing unit complements with a required limiting condition, ease of specifying work of a configuration definition for a user is still maintained even when the procedure generation system according to the present example embodiment is used.

Furthermore, the procedure complementing unit according to the present example embodiment may complement a generated operation procedure with processing of exchanging a generated value. Therefore, the procedure generation system may generate an operation procedure in which a value generated during task execution is utilized as a property.

Note that the procedure generation system 100 according to the present example embodiment is realized by, for example, a central processing unit (CPU) which executes processing in accordance with a program stored in a storage medium. In other words, the configuration definition complementing unit 101, the procedure generation unit 102, and the procedure complementing unit 103 are realized by, for example, the CPU which executes processing in accordance with program control.

Alternatively, each unit in the procedure generation system 100 according to the present example embodiment may be realized by a hardware circuit.

Figure 15:
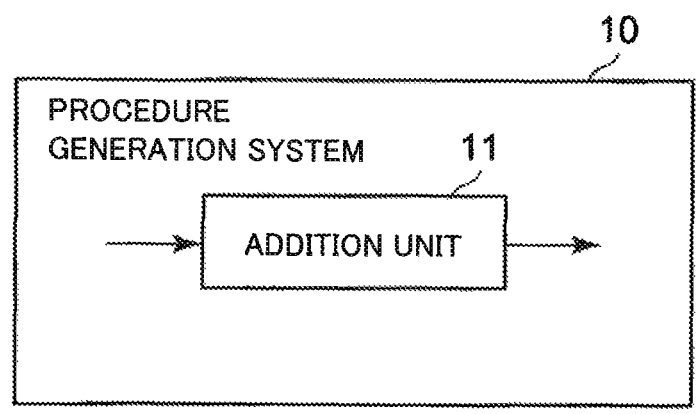
FIG. 15 is a block diagram illustrating an overview of a procedure generation system according to the embodiment of the present invention.

Next, an overview of the embodiment of the present invention is described. FIG. 15 is a block diagram illustrating an overview of a procedure generation system according to the embodiment of the present invention. A procedure generation system 10 according to the embodiment of the present invention receives an input of a configuration definition, and generates an operation procedure for the configuration definition. The configuration definition includes definitions of a plurality of state elements. The plurality of state elements include a state element having a limiting condition that a value of a property within a definition of a state element may be referenced when the state element is in a predetermined state. The procedure generation system includes an addition unit 11 (e.g., a configuration definition complementing unit 101) which adds a stipulation that the state element having the limiting condition be in the predetermined state, to a condition of a state transition of a predetermined state element in which the property within the definition of the state element having the limiting condition is referenced.

With such a configuration, the procedure generation system may generate such an operation procedure for a plurality of tasks that an output of a predetermined task is utilized in another subsequent task.

Furthermore, the procedure generation system 10 may include a complementing unit (e.g., a procedure complementing unit 103) which complements the operation procedure with an operation of storing a value of the property within the definition of the state element generated by executing the state transition of the state element having the limiting condition to the predetermined state, in association with the property.

With such a configuration, the procedure generation system may add processing of saving a value of a state property output by executing the state transition in a corresponding variable of the state property in a variable region secured for each state element.

Moreover, the complementing unit may complement the operation procedure with an operation of reading the held value of the property when the state transition of the predetermined state element in which the property within the definition of the state element having the limiting condition is referenced is executed.

With such a configuration, the procedure generation system may add processing of reading a value from a variable of a state property before a state transition that refers to the state property is executed.

Furthermore, the procedure generation system 10 may include a generation unit (e.g., a procedure generation unit 102) that generates an operation procedure for the configuration definition in which the stipulation that the state element having the limiting condition be in the predetermined state is added to the condition of the state transition of the predetermined state element.

With such a configuration, the procedure generation system may generate an operation procedure for a configuration definition including a state transition to which a condition is added.

The embodiment of the present invention has been described so far with the above example embodiments as exemplars. However, the embodiment of the present invention is not limited to the example embodiments described above. In other words, various aspects that may be appreciated by a person skilled in the art are applicable to the embodiment of the present invention within the scope of the embodiment of the present invention.

This application is based upon and claims the benefit of priority from Japanese patent application No. 2016-006904, filed on Jan. 18, 2016, the disclosure of which is incorporated herein in its entirety by reference.

REFERENCE SIGNS LIST 10, 100 Procedure generation system
11 Addition unit
101 Configuration definition complementing unit
102 Procedure generation unit
103 Procedure complementing unit
201 Configuration definition input unit
202 Procedure output unit

What is claimed is:

1. A procedure generation system comprising:
a memory configured to store instructions; and
a processor configured to execute the instructions to:
receive an input of a configuration definition of a system to be constructed, the configuration definition indicating a change to a previously defined configuration definition,
the configuration definition having state-element-definitions of a plurality of state elements, the state-element-definitions respectively representing a plurality of tasks that implement the configuration definition configuration elements of the system to be constructed, each of the state-element-definitions having states that one of the plurality of state elements is able to be in, a state transition between the states, and a property having a value in a particular state defined in the state-element-definition having the property of the state element, and the plurality of state elements including:
a first state element having the state-element-definition having a limiting condition having the property that is referred to by a second state element when the first state element is in a predetermined state as the particular state, and the second state element having the state-element-definition having the state transition referring to the property included in the first state element;

generate an operation procedure for the configuration definition, wherein the operation procedure comprises a current state of each state-element and a required state of each of the state-elements in accordance with the configuration definition;

subsequent to the generating, validate each state transition in the operating procedure including values and references related to each state transition, wherein the validating dynamically:

adds, to the operation procedure, a stipulation that the first state element is in the predetermined state, to a condition for the state transition of the second state element, by referring to the property in the state-element-definition of the first state element; and adds, to the operation procedure, a task region including at least one task of the plurality of tasks and a variable region including at least one variable secured for each of the state elements to the generated operation procedure, by complementing the generated operation procedure with (1) an operation of saving a value output by the at least one task into the variable corresponding to the property and (2) an operation of reading the value from the variable corresponding to the property referenced by the at least one task when the at least one task is executed; and based on the validation, execute the operation procedure in order to construct the system.

2. The procedure generation system according to claim 1, wherein the processor is further configured to execute the instructions to:

complement the operation procedure with an operation of storing a value of a property in the state-element-definition of the first state element generated by executing the state transition of the first state element having the limiting condition to the predetermined state, in association with the property.

3. The procedure generation system according to claim 2, wherein the processor is further configured to execute the instructions to:

complement the operation procedure with an operation of reading the stored value of the property, when executing the state transition of the second state element referring to the property in the state-element-definition of the first state element having the limiting condition.

4. The procedure generation system according to claim 1, wherein the processor is further configured to execute the instructions to generate the operation procedure for the configuration definition, in which the stipulation that the first state element having the limiting condition is being in the predetermined state is added to the condition of the state transition of the second state element.

5. The procedure generation system according to claim 1, wherein the predetermined state is a property referable state in which the value of the property is determined.

6. The procedure generation system according to claim 5, wherein the states, which the first element takes, include a state in which the value of the property is undetermined and the property referable state.

7. The procedure generation system according to claim 1, wherein the processor is further configured to execute the instructions to:

receive specification of reference to the property of the first state element, from a user, for state transition of the second state element; and add the stipulation in correspondence to the specification of reference of the property.

8. A procedure generation method comprising:

receiving an input of a configuration definition of a system to be constructed, the configuration definition indicating a change to a previously defined configuration definition, the configuration definition having state-element definitions of a plurality of state elements, the state-element-definitions respectively representing a plurality of tasks that implement the configuration definition configuration elements of the system to be constructed, each of the state-element definitions having states that one of the plurality of state elements is able to be in, a state transition between the states, and a property having a value in a particular state defined in the state-element definition having the property of the state element, and the plurality of state elements including:
a first state element having the definition having a limiting condition having the property that is referred to by a second state element when the first state element is in a predetermined state as the particular state, and the second state element having the state-element-definition having the state transition referring to the property included in the first state element;

generating an operation procedure for the configuration definition, wherein the operation procedure comprises a current state of each state-element and a required state of each of the state-elements in accordance with the configuration definition;

subsequent to the generating, validating each state transition in the operating procedure including values and references related to each state transition, wherein the validating comprises:

dynamically adding a stipulation that the first state element is in the predetermined state, to a condition for the state transition of the second state element, by referring to the property in the definition of the first state element; and dynamically adding a task region including at least one task and of the plurality of tasks a variable region including at least one variable secured for each of the state elements to the generated operation procedure, by complementing the generated operation procedure with (1) an operation of saving a value output by the at least one task into the variable corresponding to the property and (2) an operation of reading the value from the variable corresponding to the property referenced by the at least one task when the at least one task is executed; and based on the validation, executing the operation procedure in order to construct the system.

9. The procedure generation method according to claim 8, further comprising:

complementing the operation procedure with an operation of storing a value of a property in the state-element-definition of the first state element generated by executing the state transition of the first state element having the limiting condition to the predetermined state, in association with the property.

10. The procedure generation method according to claim 9, further comprising:

complementing the operation procedure with an operation of reading the stored value of the property, when executing the state transition of the second state element referring to the property in the state-element-definition of the first state element having the limiting condition.

11. A non-transitory storage medium storing a procedure generation program, which, when executed by a computer, cause the computer to:

receive an input of a configuration definition of a system to be constructed, the configuration definition indicating a change to a previously defined configuration definition;

the configuration definition having state-element-definitions of a plurality of state elements, the state-element-definitions respectively representing a plurality of tasks that implement the configuration definition configuration elements of the system to be constructed, each of the state-element-definitions having states that one of the plurality of state elements is able to be in, a state transition between the states, and a property having a value in a particular state defined in the state-element-definition having the property of the state element, and the plurality of state elements including:

a first state element having the state-element-definition having a limiting condition having the property that is referred to by a second state element when the first state element is in a predetermined state as the particular state, and the second state element having the state-element-definition having the state transition referring to the property included in the first state element;

generate an operation procedure for the configuration definition, wherein the operation procedure comprises a current state of each state-element and a required state of each of the state-elements in accordance with the configuration definition;

subsequent to the generating, validate each state transition in the operating procedure including values and references related to each state transition, wherein the validating dynamically:

adds, to the operation procedure, a stipulation that the first state element is in the predetermined state, to a condition for the state transition of the second state element, by referring to the property in the state-element-definition of the first state element; and adds, to the operation procedure, a task region including at least one task and a variable region including at least one variable secured for each of the state elements to the generated operation procedure, by complementing the generated operation procedure with (1) an operation of saving a value output by the at least one task into the variable corresponding to the property and (2) an operation of reading the value from the variable corresponding to the property referenced by the at least one task when the at least one task is executed; and based on the validation, execute the operation procedure in order to construct the system.

12. The non-transitory storage medium storing the procedure generation program according to claim 11, wherein the procedure generation program is further configured to cause the computer to:

complement the operation procedure with an operation of storing a value of a property in the state-element-definition of first state element generated by executing the state transition of the first state element having the limiting condition to the predetermined state, in association with the property.

13. The non-transitory storage medium storing the procedure generation program according to claim 9, wherein the procedure generation program is further configure to cause the computer to:

complement the operation procedure with an operation of reading the stored value of the property, when executing the state transition of the second state element referring to the property in the state-element-definition of the first state element having the limiting condition.

* * * * *